United States Patent
Lorsch

(10) Patent No.: US 6,192,113 B1
(45) Date of Patent: *Feb. 20, 2001

(54) METHOD AND APPARATUS FOR PHONE CARD BILLING

(75) Inventor: Robert H. Lorsch, Los Angeles, CA (US)

(73) Assignee: AT&T Corp, New York, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/410,857

(22) Filed: Mar. 27, 1995

(51) Int. Cl.[7] .......................... H04M 15/00; H04M 17/00
(52) U.S. Cl. ............................................. 379/114; 379/144
(58) Field of Search .............................. 379/91, 112, 113, 379/114, 115, 144, 145; 235/379, 380, 381, 382

(56) References Cited

U.S. PATENT DOCUMENTS

| | | | |
|---|---|---|---|
| 4,706,275 | * 11/1987 | Kamil | 379/144 |
| 4,734,569 | 3/1988 | Kawana et al. | 235/487 |
| 4,893,330 | * 1/1990 | Franco | 379/145 |
| 5,086,457 | 2/1992 | Barraud et al. | 3794/144 |
| 5,287,403 | * 2/1994 | Atkins | 379/112 |
| 5,353,335 | * 10/1994 | D'Urso et al. | 379/144 |
| 5,477,038 | * 12/1995 | Levine et al. | 235/380 |
| 5,504,808 | * 4/1996 | Hamrick, Jr. | 379/144 |
| 5,509,056 | * 4/1996 | Ericsson | 379/114 |
| 5,511,114 | * 4/1996 | Stimson | 379/114 |
| 5,513,117 | * 4/1996 | Small | 235/381 |
| 5,546,446 | * 8/1996 | Tsunokawa | 379/144 |
| 5,684,291 | * 11/1997 | Taskett | 235/379 |

* cited by examiner

Primary Examiner—Vijay Shankar

(57) ABSTRACT

A method and apparatus for phone card billing wherein phone cards comprising PINs associated with a specific account credited with a predetermined number of units are sold to phone card clients without any prepayment for the value of the phone card units. The phone card client is not required to pay for the phone card units unless and until a corresponding phone card PIN is activated for a first time by an end user, thereby reducing the phone card client's initial financial burden of prepaying for phone card units, and eliminating payment by the phone card client for phone card units that are never used by an end user. When an end user uses a phone card by dialing a special number and entering a PIN, a call processing computer connected to a special exchange verifies the entered PIN prior to connecting the end user's call. The call processing computer periodically and automatically downloads entered PINs to an invoicing computer system which automatically bills appropriate phone card clients for the value of the phone card units when a corresponding phone card PIN accessing these units is activated for the first time.

7 Claims, 2 Drawing Sheets

METHOD AND APPARATUS FOR PHONE CARD BILLING

FIELD OF THE INVENTION

This invention relates to a method and apparatus for phone card billing, and more specifically to a method and apparatus for phone card billing which provides financial benefits to a phone card client.

BACKGROUND OF THE INVENTION

Various methods and systems for the sale and use of prepaid telephone calls are well known in the telecommunications industry. For example, U.S. Pat. No. 4,706,275, incorporated herein by reference, describes the implementation and operation of a telephone system that allows for prepayment of telephone calls, wherein credit information and a special code for a specific account are stored in memory in special exchanges, and wherein the amount of prepaid minutes in that specific account are debited as a call, made using that special code, progresses. Such systems are well known in the telecommunications industry, and a detailed description is not provided herein. Special codes are typically referred to as Personal Identification Numbers, or PINs.

It is to be understood that the special code, or PIN, which enables an end user to access a specific account can be provided in various forms, such as on a label or a phone card. For example, a phone card company sells a plurality of phone cards with distinct PINs on each of the phone cards to a phone card client, or middleman, such as a retailer, a vending machine operator, a promotional advertiser, etc. These phone cards are then typically re-sold at retail, sold as collectibles, or given away as promotional items, by the phone card client to an end user.

Each PIN printed on each individual phone card corresponds to a specific account that is credited with a predetermined number of telephone call units, such as minutes. In other words, in a preferred embodiment, each PIN is linked to a specific number of minutes of "talk time."

An end user purchases or receives a phone card from one of these phone card clients. To place a call, the end user typically calls a special phone number, and then enters the PIN along with the phone number the end user is trying to reach. The number of units remaining in a specific account is debited by the number of units spent by the end user on telephone calls.

However, there is a significant drawback for phone card clients with the way that phone cards are currently being sold. The drawback with the currently available phone cards is that phone card clients that want to sell phone cards through retail channels, or distribute them through promotional giveaways, must prepay the phone card company in advance for all of the phone card units received. The units received represent credits to accounts corresponding to the PINs on the phone cards being sold to the phone card client. When a phone card client purchases a large number of phone card units for re-sale or distribution, the prepayment for these phone cards to the phone card company can reach into the thousands of dollars, and represent a financial burden on the phone card client. This is especially true when the phone card client is interested in distributing phone cards free to end users for promotional purposes.

For example, assume that company A wants to advertise their products or services by placing their company logo and phone number on a phone card, wherein the phone card has a PIN that is linked to a specific account credited with ten minutes of talk time. Company A wishes to distribute these phone cards free of cost to potential customers as part of an advertising campaign. Currently, company A must prepay the phone card company for all of the phone card units being purchased for distribution. In other words, 100 phone cards good for ten minutes each means the phone card client must pay for 1000 minutes up front. Prepayment for these minutes is required even though there is a good chance that a significant number of these phone cards, along with their prepaid units, may never be used by an end user.

Therefore, a better solution is needed to minimize the financial burden on the phone card client providing phone cards to end users, and to ensure that phone card clients are charged for the phone card units received only if the corresponding phone card units are actually used by an end user.

SUMMARY OF THE INVENTION

The method and apparatus of the present invention for phone card billing provides phone card clients with the benefits associated with the sale or distribution of phone cards, while reducing the associated drawbacks, such as the initial financial burden of prepaying for phone card units, or the wasted cost of prepaying for phone card units that never get used by an end user.

The method and apparatus of the present invention for phone card billing provides phone card clients with phone cards comprising a PIN associated with a specific account credited with a predetermined number of units, such as minutes. The phone card client is only required to make a nominal up front payment to the phone card company to cover the cost of producing the phone cards, or the cost of packaging each phone card or label containing a PIN. The phone card client is not required to prepay the phone card company for the number of phone card units being purchased for re-sale or distribution to end users. The nominal up front fee for the phone cards is significantly less than the value of the phone card units associated with each of the PINs on the phone cards.

An end user that purchases or receives a phone card implementing the method and apparatus of the present invention will not notice anything different in their use of a phone card. To place a call, the end user calls a special number, and then enters the PIN along with the phone number the end user is trying to reach. To the end user, the method and apparatus of the present invention for phone card billing resembles the prior art telephone systems. A call processing platform computer system verifies that the entered PIN is a valid PIN. When the entered PIN is verified, the end user's phone call is connected to the phone number. Upon connection to the phone number dialed by the end user, the number of minutes remaining in the specific account corresponding to the entered PIN is debited by the number of minutes spent by the end user on telephone calls.

However, unlike the prior art, the call processing computer system downloads all user-entered PINs to an invoicing computer system on a periodic basis. After receiving all of these user-entered PINs, the invoicing computer system processes the received PINs to determine whether these PINs have been previously used by an end user. If the invoicing computer system determines that any of the PINs entered by an end user is being used for the first time, then certain information relating to the corresponding phone card account, such as the phone card client that purchased that PIN, are copied to an "invoice" database for further processing. This process is transparent to the end user, and the end user's telephone calls are connected in the usual manner by the special exchange.

The invoice database therefore contains a listing of PINs recently used for the first time, along with each PIN's corresponding account information. This account information is used to generate invoices which are then billed to the appropriate phone card clients that sold or distributed the recently activated phone cards. In this way, the phone card client is only billed for phone card units when the phone card units are first used by an end user. It is to be understood that an invoice database, as described herein, is typically defined by a software program which categorizes data and then stores that categorized data onto a hard disk drive, or other equivalent storage device, in a manner well known in the computer art.

For example, if company A distributes a phone card to an end user, and that end user keeps the card for its promotional message, or as a collectible item, or if the end user loses or throws away the phone card, the only expense incurred by company A is the nominal cost of the phone card, and not the more substantial cost of the phone card units associated with the PIN on that phone card. Therefore, the method and apparatus of the present invention for phone card billing provides the phone card client with benefits previously unavailable in the phone card industry.

Accordingly, it is an object of the present invention to provide an improved method and apparatus for phone card billing.

It is a further object of the present invention to provide a method and apparatus for phone card billing that reduces a phone card client's initial financial burden by delaying payment for phone card units until a corresponding phone card PIN accessing these units is activated for the first time.

An additional object of the present invention is to provide a method and apparatus for phone card billing that does not require a phone card client to pay for phone card units that are never used by an end user.

Further objects and advantages of the present invention will become apparent from a consideration of the drawings and ensuing description.

DETAILED DESCRIPTION OF A PREFERRED EMBODIMENT

Figure 1:
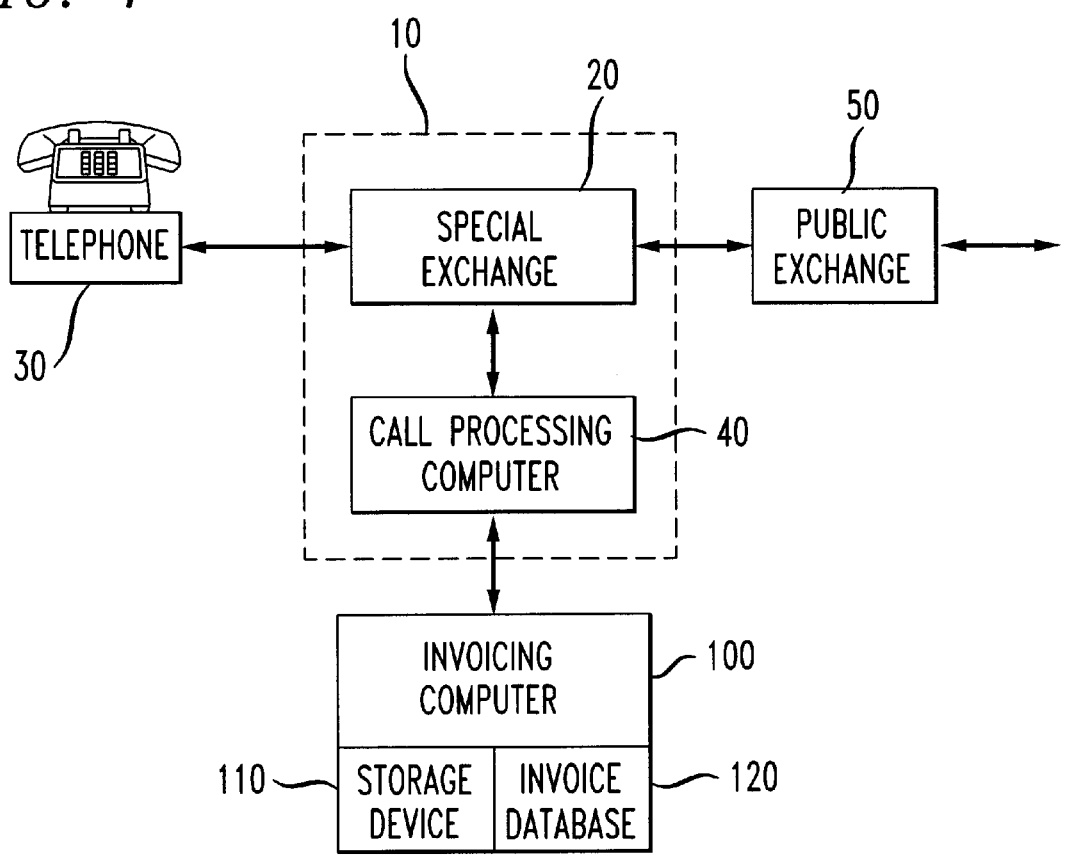
FIG. 1 is a block diagram of a telephone system for implementing the method and apparatus of the present invention for phone card billing, which is shown in electrical communication with an invoicing computer system.

FIG. 1 illustrates a telephone system 10 for implementing the method and apparatus of the present invention for phone card billing, which is shown in electrical communication with an invoicing computer system 100. In the manner that a typical prior art telephone system operates, an end user accesses the telephone system 10 by calling a special number, typically a toll-free 800 number, to reach a special exchange 20 from any telephone 30. The end user then inputs a PIN followed by the phone number the end user is trying to reach. In a preferred embodiment, an interactive voice response unit is used to provide automated prompts to the end user.

A call processing platform computer 40, which is in electrical communication with the special exchange 20, processes the PIN to determine whether the PIN is valid and whether any units remain in the corresponding account. If the PIN is valid and a sufficient number of units remain in the account, the special exchange 20 connects the end user to the end user-dialed phone number via a public exchange 50, in a manner well known in the telecommunications industry. The call processing computer 40 debits units from the accessed account according to the end user's corresponding telephone usage. It is to be understood that the call processing computer 40 preferably comprises a hard disk drive for data storage, a microprocessor for processing, and random access memory for temporary data storage (components not shown). The operation of a typical computer system for processing information is well known in the computer art, and is not discussed in further detail.

The invoicing computer system 100 of the present invention for phone card billing is placed in electrical communication with the call processing computer 40 which processes the incoming calls and PINs. All of the PINs received by the call processing computer 40 are periodically and automatically downloaded to the invoicing computer system 100. The downloading of data can be accomplished in various ways known to those in the computer industry, such as through a modem connection, or transmission of data on a medium such as a floppy disk. The invoicing computer system 100 then processes these received PINs to determine whether each individual PIN is being activated for the first time, or whether that PIN has been previously activated by an end user.

If the PIN is being activated for the first time, then certain specific account information corresponding to that PIN is retrieved from a storage device 110, which is in communication with the invoicing computer system 100, to link the activated PIN with the identity of the phone card client that purchased the corresponding phone card units from the phone card company. Based upon this information, an invoice is automatically prepared billing the appropriate phone card client for the cost of the phone card units that have been accessed for the first time by the end user's use of the corresponding PIN. If the PIN was previously activated, then the telephone system 10 keeps track of units used in a manner well known in the telecommunications industry. In a preferred embodiment, the storage device 110 is a hard disk drive in the invoicing computer system 100. It is to be understood that the storage device 110 may be one of various data storage mediums available such as CD-ROM, floppy disk, etc.

Figure 2:
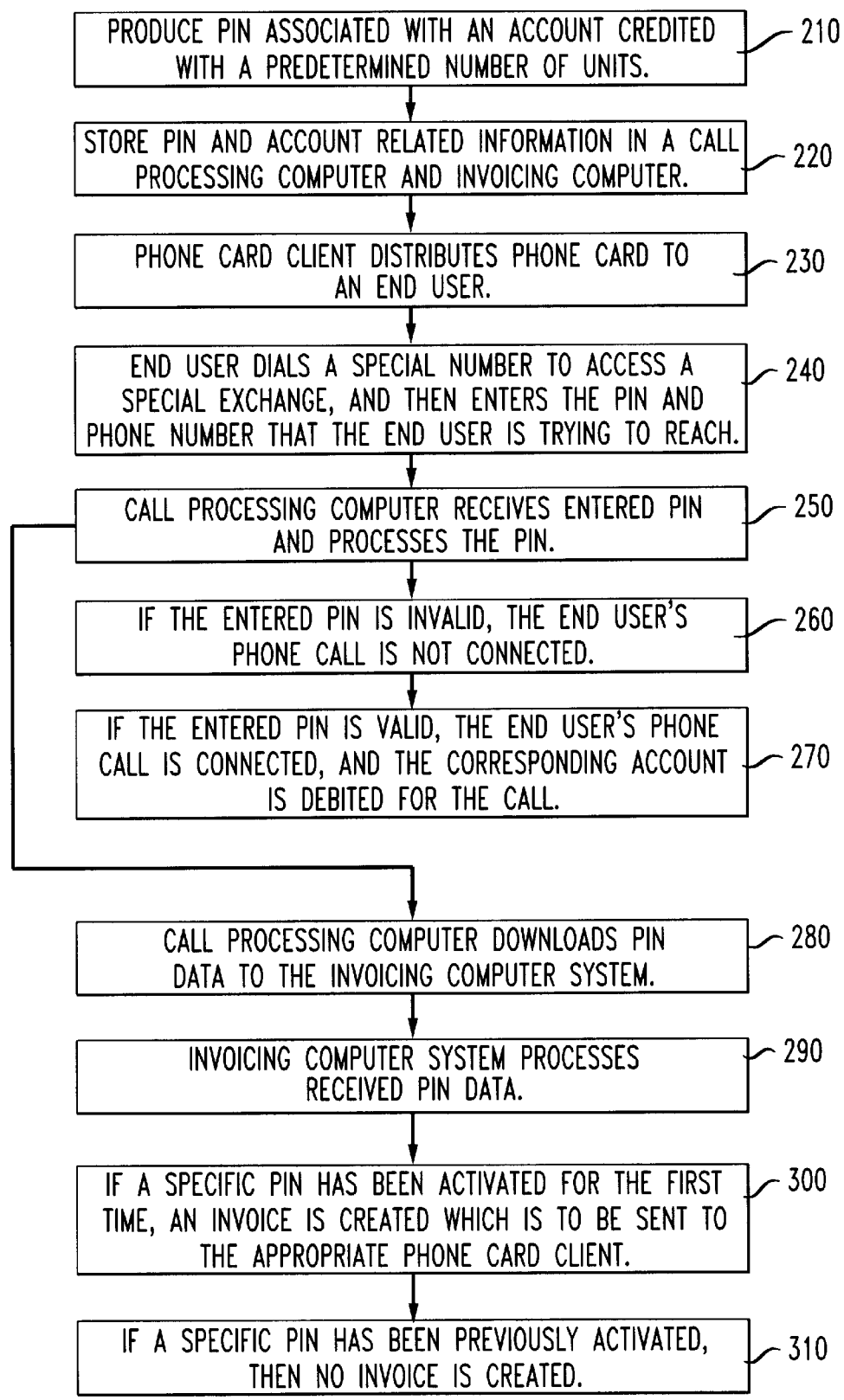
FIG. 2 is a flow chart illustrating steps in a preferred method of the present invention for phone card billing.

In FIG. 2, a flow chart is provided to illustrate a preferred method of the present invention for phone card billing. First, a phone card company with access to a telephone system such as those known in the prior art, produces a plurality of phone cards, with each phone card having a distinct PIN. Each PIN is associated with a specific account credited with a predetermined number of phone card units, as shown in the step labeled 210. Each PIN has a control number assigned to it for identification and tracking purposes, and a client number assigned to it for linking each PIN sold to a purchasing phone card client.

For example, a first set of phone cards is produced for a phone card client with that customer's company "A" logo and telephone number. In a preferred embodiment, these cards have a PIN and "N minutes" printed on the phone card, where "N" represents the number of minutes credited to the corresponding account, such as 30 or 60 or 90. As these phone cards are produced, the PINs and corresponding minutes associated with each phone card are stored in the call processing computer 40 and the invoicing computer system's 100 storage device 110. Each PIN is linked to a specific account, and sold to the phone card client company A, with each account being credited with N minutes of talk time. A second set of phone cards are made for phone card client company "B". These phone cards are for "N minutes" and all of the PINs printed on the phone card client company B's phone cards are stored in the call processing computer 40 and the invoicing computer system's 100 storage device 110 as well. These PINs are also linked to specific accounts, and sold to the phone card client company B with each account being credited with N minutes of talk time. All PINs that are generated are linked by a client number to the particular phone card client that purchased a particular set of phone cards, and this information is stored in the storage device 110 of the invoicing computer system 100 as well, as shown in the step labeled 220.

The phone card client then sells or gives away these phone cards to the end users, as shown in the step labeled 230. An end user that purchases or receives a phone card implementing the method and apparatus of the present invention will not notice anything different in the use of their phone card. To place a call, the end user calls a toll-free 800 number, and then enters the PIN along with the phone number the end user is trying to reach, as shown in the step labeled 240. To the end user, the method and apparatus of the present invention for phone card billing resembles the prior art telephone systems. The call processing computer 40, which is in electrical communication with the special exchange 20, processes the entered PIN, as shown in the step labeled 250. The call processing computer 40 compares the entered PIN with the previously stored valid PINs to determine whether the entered PIN is a valid one. If the entered PIN is invalid, the end user's call is not connected, as shown in the step labeled 260. If the entered PIN is valid and has sufficient units remaining, the special exchange 20 connects the end user to the end user-dialed phone number via the public exchange 50 in a manner well known in the telecommunications industry. The remaining units associated with the valid PIN are debited from the corresponding account based upon the end user's telephone usage, as shown in the step labeled 270.

The following steps may take place concurrently with an end user's phone call, or may take place at a later time. All of the PINs received by the call processing computer 40 are periodically and automatically downloaded to the invoicing computer system 100, as shown in the step labeled 280. The invoicing computer system 100 then processes these received PINs to determine whether each individual PIN is being activated for the first time, or whether that PIN has been previously activated by an end user, as shown in the step labeled 290, by comparing the received PINs with a list of issued PINs and an updated list of activated PINs stored in the storage device 110.

If the PIN is being activated for the first time, then certain information corresponding to that PIN is retrieved from the invoicing computer system's 100 storage device 110. For example, by linking an individual PIN to its corresponding account information and client number, the invoicing computer system 100 can determine the identity of the phone card client that purchased and distributed the phone card being used by an end user for the first time. This information is then sent to an invoice database 120 in the invoicing computer system 100. The invoicing computer system 100 is programmed to process the information in the invoice database 120, and to automatically prepare invoices for all of the phone card clients that purchases PINs which have been recently activated for the first time. These invoices are periodically generated as new first-time PINs are identified, and then sent to the appropriate phone card clients for payment of the value of the phone card units that have been accessed for the first time, as shown in the step labeled 300. If the PIN has been previously activated, then the invoicing computer system 100 does not generate an invoice, as shown in the step labeled 310. Once an invoice is generated for a first-time activated PIN, that PIN is stored in the invoicing computer system's 100 storage device 110 as a previously activated PIN so that the next time that PIN is used, the corresponding phone card client will not get billed again.

While the above description contains many specificities, these should not be construed as limitations on the scope of the invention, but rather as an exemplification of preferred embodiments thereof. Many other variations are possible.

What is claimed is:

1. A method for prepaid phone card billing between a phone card company that manufactures prepaid phone cards and a phone card client that distributes the prepaid phone cards to end-users, comprising the following steps:

associating a prepaid phone card having a PIN with an account credited with a predetermined number of phone card units usable towards making phone calls;

providing the prepaid phone card to the phone card client without charging the client for the predetermined number of phone card units;

distributing the prepaid phone card to an end-user; and billing the phone card client for said predetermined number of phone card units after the prepaid phone card is used for the first time by the end-user to access the predetermined number of phone card units.

2. A method for prepaid phone card billing between a phone card company and a phone card client comprising the following steps;

associating a prepaid phone card having a PIN with an account credited with a predetermined number of phone card units usable toward making phone calls;

providing said prepaid phone card from the phone card company to the phone card client without charging said client for said predetermined number of phone card units;

distributing the prepaid phone card from the phone card client to end-user;

receiving an entered PIN at a call processing computer; and billing said phone card client for said predetermined number of phone card units after said prepaid phone card is used for the first time by the end-user to access said phone card units.

3. A method for phone card billing between a phone card company and a phone card client that distributes phone cards to end-users comprising the following steps:

(a) producing a distinct PIN associated with an account credited with a predetermined number of units usable toward making phone calls, (b) the phone card company providing said units to a phone card client free of prepayment for said predetermined number of units, and the phone card client then distributing a phone card associated with the account to an end-user, (c) receiving an entered PIN at a call processing computer, the receipt of the entered PIN indicating the end-user is attempting to access the account, (d) verifying said entered PIN as a valid PIN by comparing said entered PIN with said distinct PIN at said call processing computer, (e) downloading said entered PIN if it is a valid PIN to an invoicing computer, (f) processing said valid PIN to determined whether said valid PIN is being activated for a first time by the end-user, and (g) generating an invoice to be sent to said phone card client for said predetermined number of units after said valid PIN corresponding to said distinct PIN and to said predetermined number of units is activated for a first time to access said predetermined number of units.

4. The method of claim 3 for phone card billing, further comprising the following steps to be performed after step (b) and prior to step (c):

linking said distinct PIN with information relating to said phone card client and said account, storing said PIN in said call processing computer, and storing said PIN and said information in said invoicing computer.

5. An apparatus for phone card billing between a phone card company and a phone card client that distributes phone cards to end-users, comprising:

an invoicing computer operated by the phone card company capable of receiving an entered PIN from a call processing computer, said invoicing computer comprising a storage device for storing a distinct PIN associated with an account credited with a predetermined number of units usable towards making phone calls, said storage device further comprising information linking said distinct PIN with a corresponding phone card client that has received and distributed said predetermined number of units in the form of a phone card to an end-user, said invoicing computer further comprising an invoice database for storing said entered PIN if said entered PIN is valid and has been activated for a first time by the end-user, and said invoicing computer capable of generating an invoice to be sent to said corresponding phone card client for said predetermined number of units after said entered PIN corresponding to said distinct PIN and to said predetermined number of units is activated for a first time by the end-user to access said predetermined number of units.

6. An apparatus for phone card billing between a phone card company that manufactures phone cards and a phone card client that distributes the phone cards to end users comprising:

a telephone system comprising a special exchange and a call processing computer, said special exchange capable of communicating with a telephone, a public exchange, and said call processing computer, an invoicing computer operated by the phone card company capable of communicating with said call processing computer, said call processing computer capable of receiving a PIN from an end user using said telephone and downloading said PIN to said invoicing computer, and said invoicing computer capable of generating an invoice to be sent to the phone card client after a PIN corresponding to phone card units previously received by the phone card client is activated for a first time by the end user.

7. A method of pre-paid phone card billing, comprising:

distributing a plurality of pre-paid phone cards from a phone card company that manufactures the pre-paid phone cards to a plurality of phone card clients, without billing the phone card clients for the pre-paid phone cards at the time of distribution;

distributing the plurality of pre-paid phone cards from the plurality of phone card clients to a plurality of end-users; and billing the phone card clients for the value of the pre-paid phone cards when the end-users activate the pre-paid phone cards for the first time.

* * * * *